United States Patent
Sayre et al.

(10) Patent No.: US 8,124,260 B2
(45) Date of Patent: Feb. 28, 2012

(54) SOLUTION BASED ENHANCEMENTS OF FUEL CELL COMPONENTS AND OTHER ELECTROCHEMICAL SYSTEMS AND DEVICES

(75) Inventors: Jay R. Sayre, Columbus, OH (US); Megan E. Sesslar, Hilliard, OH (US); James L. White, Columbus, OH (US); John R. Stickel, London, OH (US); Mark C. Stasik, Columbus, OH (US); Bhima R. Vijayendran, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 1100 days.

(21) Appl. No.: 11/667,781
(22) PCT Filed: Nov. 16, 2005
(86) PCT No.: PCT/US2005/041571
 § 371 (c)(1), (2), (4) Date: Dec. 3, 2007
(87) PCT Pub. No.: WO2006/055652
 PCT Pub. Date: May 26, 2006

(65) Prior Publication Data
US 2008/0248362 A1 Oct. 9, 2008

Related U.S. Application Data

(60) Provisional application No. 60/628,834, filed on Nov. 16, 2004, provisional application No. 60/628,797, filed on Nov. 16, 2004.

(51) Int. Cl.
 *H01M 8/10* (2006.01)
(52) U.S. Cl. .......................................... 429/33; 252/500
(58) Field of Classification Search .................... 429/33; 252/500
 See application file for complete search history.

(56) References Cited

U.S. PATENT DOCUMENTS
4,438,185 A 3/1984 Taskier
(Continued)

FOREIGN PATENT DOCUMENTS
EP 1304754 A1 4/2003
(Continued)

OTHER PUBLICATIONS
International Preliminary Report on Patentability (PCT/US2005/041571—Nov. 16, 2005).
(Continued)

*Primary Examiner* — Peter D. Mulcahy
*Assistant Examiner* — Henry Hu
(74) *Attorney, Agent, or Firm* — MacMillian, Sobanski & Todd, LLC

(57) ABSTRACT

This invention relates in general to components of electrochemical devices, and to methods of preparing the components. The components and methods include the use of a composition comprising an ionically conductive polymer and at least one solvent, where the polymer and the solvent are selected based on the thermodynamics of the combination. In one embodiment, the invention relates to a component for an electrochemical device which is prepared from a composition comprising a true solution of an ionically conductive polymer and at least one solvent, the polymer and the at least one solvent being selected such that |δ solvent−δ solute|<1, where δ solvent is the Hildebrand solubility parameter of the at least one solvent and where δ solute is the Hildebrand solubility parameter of the polymer. In another embodiment, the invention relates to a method of improving at least one property of a component for an electrochemical device or at least one property of the electrochemical device, the method comprising preparing the component from a composition comprising a true solution of an ionically conductive polymer and at least one solvent, the polymer and the at least one solvent being selected such that |δ solvent−δ solute|<1, where δ solvent is the Hildebrand solubility parameter of the at least one solvent and where δ solute is the Hildebrand solubility parameter of the polymer.

12 Claims, 7 Drawing Sheets

Electrospinning Setup Schematic

U.S. PATENT DOCUMENTS

| | | | |
|---|---|---|---|
| 4,470,859 A * | 9/1984 | Benezra et al. | 156/155 |
| 5,272,017 A | 12/1993 | Swathirajan et al. | |
| 5,378,404 A * | 1/1995 | Han et al. | 252/500 |
| 5,474,857 A | 12/1995 | Uchida et al. | |
| 5,672,438 A | 9/1997 | Banerjee et al. | |
| 6,150,426 A * | 11/2000 | Curtin et al. | 521/28 |
| 6,252,129 B1 | 6/2001 | Coffee | |
| 6,391,487 B1 | 5/2002 | Totsuka | |
| 6,642,319 B2 * | 11/2003 | Rodriguez-Parada | 525/276 |
| 6,667,268 B1 | 12/2003 | Sugawara et al. | |
| 6,746,793 B1 | 6/2004 | Gyoten et al. | |
| 6,852,410 B2 | 2/2005 | Veedu et al. | |
| 2001/0045547 A1 | 11/2001 | Senecal et al. | |
| 2002/0048706 A1 | 4/2002 | Mayes et al. | |
| 2002/0091225 A1 * | 7/2002 | McGrath et al. | 528/170 |
| 2003/0168756 A1 | 9/2003 | Balkus, Jr. et al. | |
| 2003/0198849 A1 | 10/2003 | Hampden-Smith et al. | |
| 2004/0053113 A1 | 3/2004 | Nishikawa et al. | |

FOREIGN PATENT DOCUMENTS

| | | |
|---|---|---|
| EP | 1321996 A1 * | 6/2003 |
| EP | 1383186 A1 | 1/2004 |
| EP | 1450424 A2 * | 8/2004 |
| WO | 94/24717 | 10/1994 |
| WO | WO 01/47044 A2 | 6/2001 |
| WO | WO 02/25764 A1 | 3/2002 |
| WO | WO 03/82956 A1 | 10/2003 |
| WO | WO-03/082956 A1 * | 10/2003 |
| WO | WO-2006/055652 A2 * | 5/2006 |

OTHER PUBLICATIONS

International Search Report (PCT/US2005/041571—Nov. 16, 2005).

Gary Wnek, Nanomaterials for Fuel Cells, Presentation Dated Dec. 2004, p. 14-17, 19-22, and 24.

Olga A. Baturina and Gary E. Wnek, Characterization of Membrane-Electrode Assemblies Obtained by Electrostatic Processing (2003), Abstract and p. 1.

Sanders, et al., Electrostatic Processing (Electrospraying, Electrospinning) of PEM Components, Feb. 2003.

E.H. Sanders et al., Characterization of Electrosprayed Nafion Films, Journal of Power Sources (2004), pp. 55-56.

Makoto Uchida, et al., New Preparation Method for Polymer-Electrolyte Fuels Cells, J. Electrochem. Soc., vol. 142, No. 2, Feb. 1995, pp. 463-464.

* cited by examiner

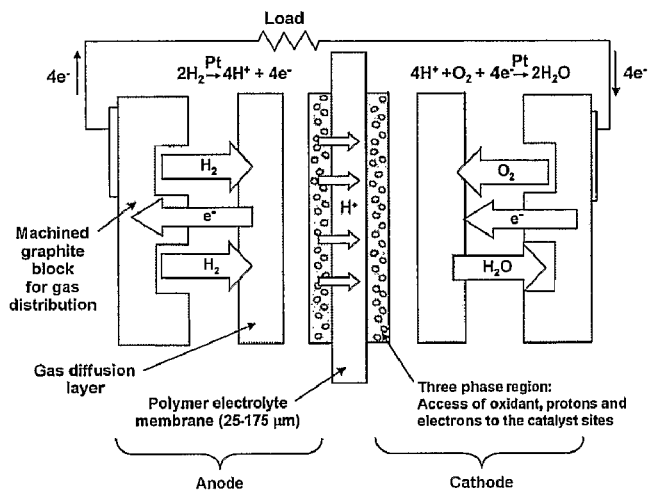
Figure 1. Cross-Sectional Schematic Diagram of a Conventional PEM Fuel Cell
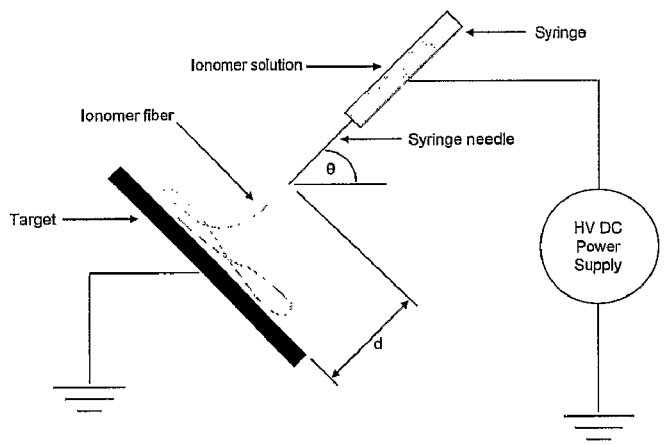
Figure 2. Electrospinning Setup Schematic

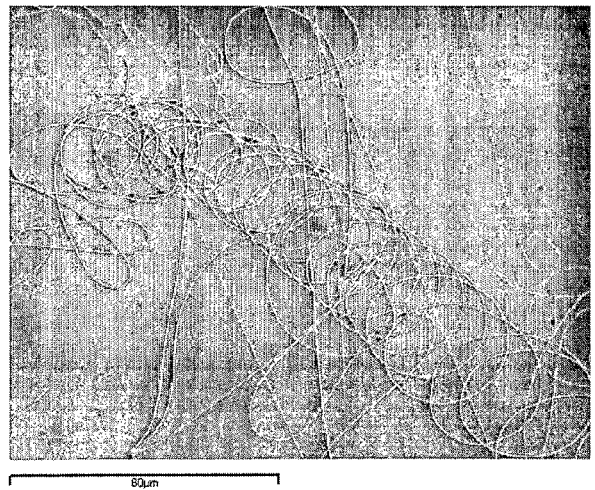
Figure 3. Isolated Ionomer Fiber (i.e. High Aspect Ratio Polymer Electrolyte)
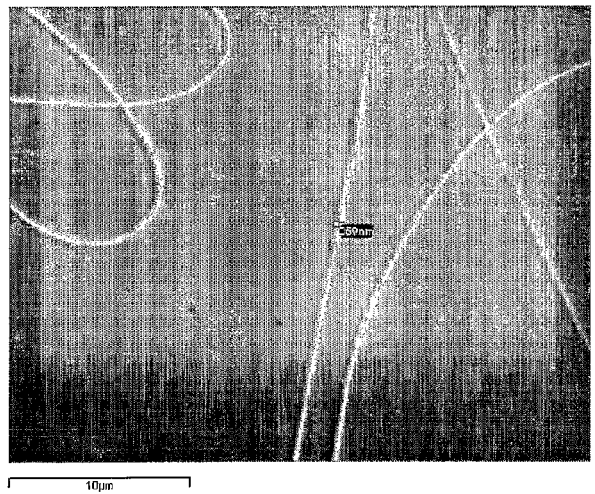
Figure 4. Isolated Ionomer Fiber (i.e. High Aspect Ratio Polymer Electrolyte)

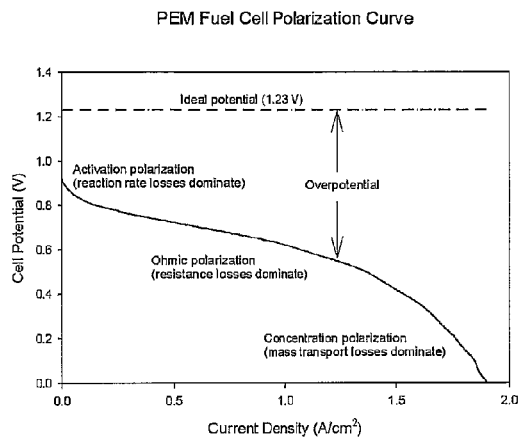
Figure 5. Typical Polarization Curve for a PEM Fuel Cell
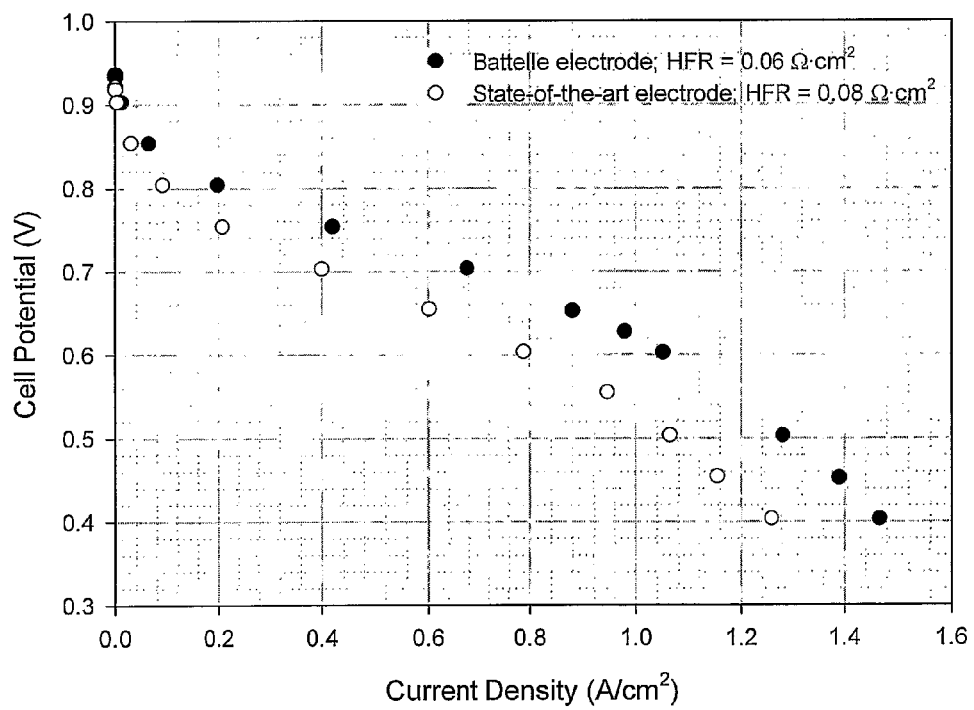
Conditions: Anode: $H_2$ at 200 sccm and 30 psig, 0.2 mg Pt per $cm^2$; Cathode: air at 500 sccm and 30 psig, 0.2 mg Pt per $cm^2$; Cell: 80 C, 100% RH; Membrane: Nafion® 112.
Figure 6. Representative Polarization Curve of a Battelle Electrode Compared to the State of the Art

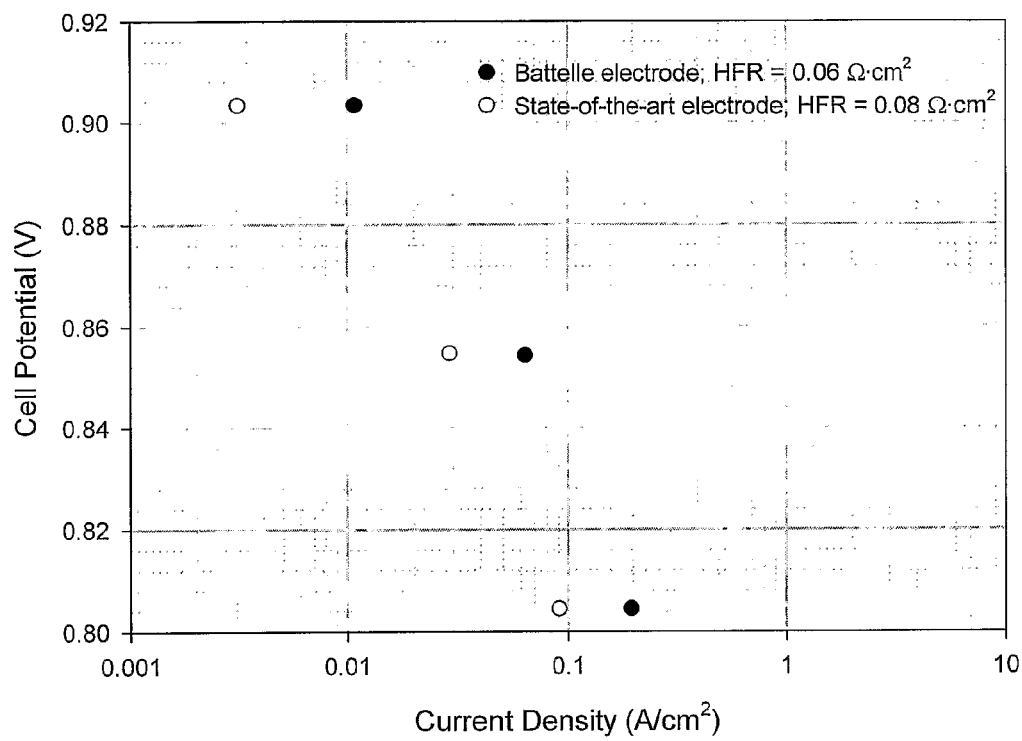
Conditions: Anode: $H_2$ at 200 sccm and 30 psig, 0.2 mg Pt per $cm^2$; Cathode: air at 500 sccm and 30 psig, 0.2 mg Pt per $cm^2$; Cell: 80 C, 100% RH; Membrane: Nafion® 112.
Figure 7. Close-up of the Activation Polarization Region Comparing a Battelle Electrode to the State of the Art.

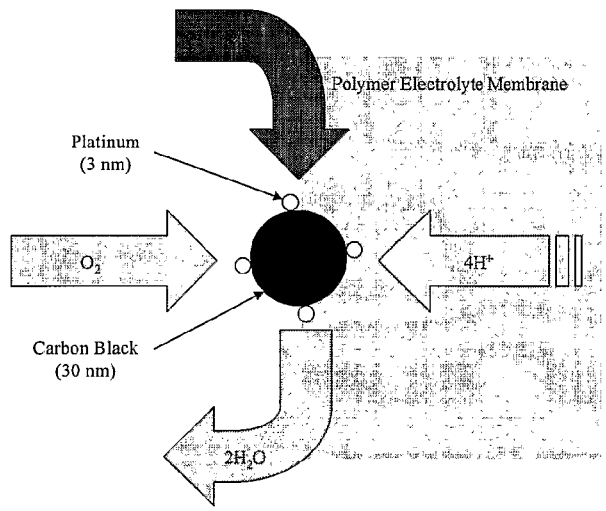
Figure 8. Three-phase Interphase Schematic for a Single Catalytic Site at the Cathode of a PEM Fuel Cell
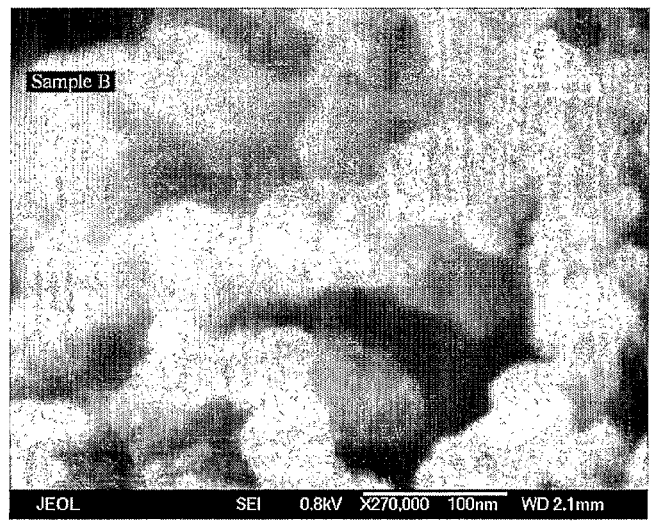
Figure 9. Field-emission SEM Image of the Pt/C Electrode Open Circuit Voltage (OCV) Holding Time @ 0.15 A/cm² Equivalent Flow Rates
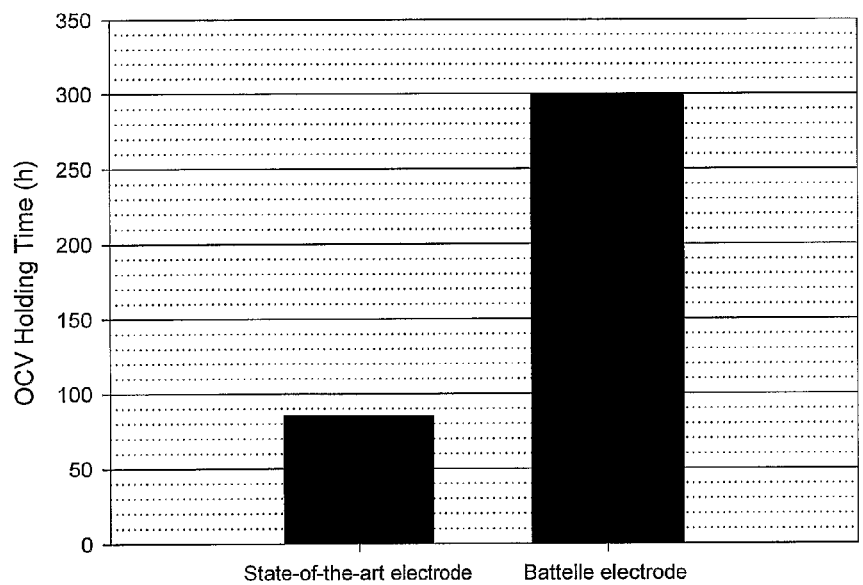
Conditions: Anode: $H_2$ at 14.7 psia, 0.5 mg PtRu per $cm^2$; Cathode: air at 14.7 psia, 0.5 mg Pt per $cm^2$; Cell: 85 C, 13% RH; Membrane: Nafion® 112.
Figure 10. Electrode Durability
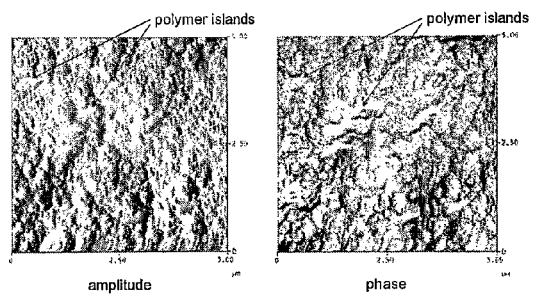
Figure 11. AFM Tapping Mode Images of Electrodes Fabricated from *n*-Butyl Acetate

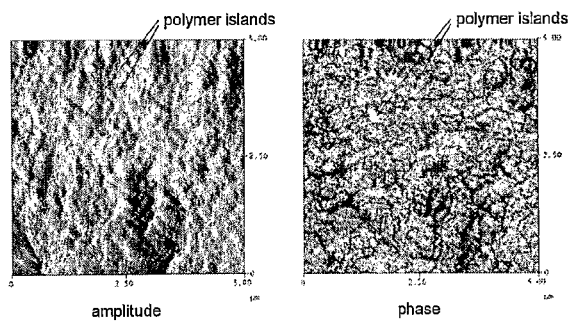
Figure 12. AFM Tapping Mode Images of Electrodes Fabricated from *t*-Butyl Alcohol
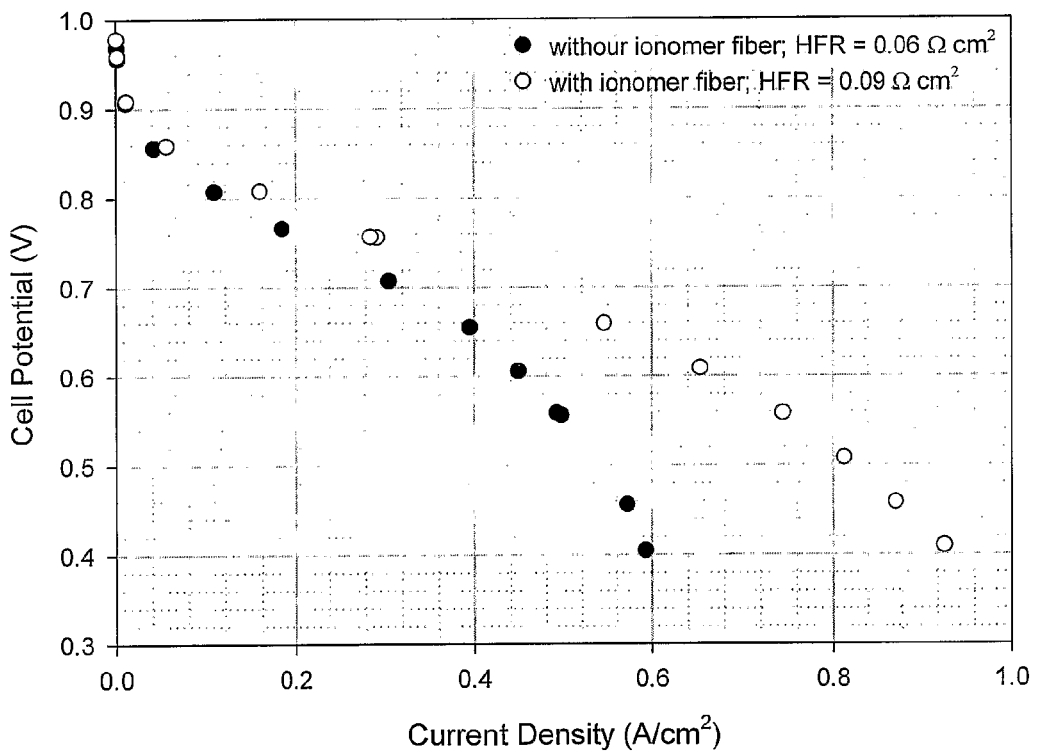
Conditions: Anode: $H_2$ at 200 sccm and 30 psig, 0.2 mg Pt per $cm^2$; Cathode: air at 500 sccm and 30 psig, 0.2 mg Pt per $cm^2$; Cell: 80 C, 100% RH; Membrane: BPSH-45, ~63.5 μm thick.
Figure 13. Representative Polarization Curve Comparing One Electrode with a High Aspect Ratio Ionomer Fiber to One without an Ionomer Fiber.

US 8,124,260 B2

SOLUTION BASED ENHANCEMENTS OF FUEL CELL COMPONENTS AND OTHER ELECTROCHEMICAL SYSTEMS AND DEVICES

CROSS-REFERENCE TO RELATED APPLICATIONS

This application is a national stage of International Application No. PCT/US2005/041571 filed Nov. 16, 2005, the disclosures of which are incorporated herein by reference, and which claimed priority to U.S. Provisional Application No. 60/628,834, filed Nov. 16, 2004, and U.S. Provisional Application No. 60/628,797, filed Nov. 16, 2004, the disclosures of which are incorporated herein by reference.

BACKGROUND OF THE INVENTION

This invention relates in general to electrochemical systems and devices, and in particular to fuel cell components.

A fuel cell is an electrochemical "device" that continuously converts chemical energy into electric energy (and some heat) for as long as fuel and oxidant are supplied. Fuel cells are evolving. Some currently known categories of fuel cells include polymer electrolyte membrane (PEM), alkaline, phosphoric acid, molten carbonate, solid oxide, and biobased. All of these fuel cell types have the advantages of silent operation, high efficiency and zero emission capability. PEMs, however, offer several distinct advantages over the others. Some of these are low temperature operation (80-150 C), quick-start-up, compactness, and orientation independence.

At the heart of the PEM fuel cell is a membrane that has thin coatings of catalyst applied to both sides comprising a membrane electrode assembly (MEA). As hydrogen flows through the anode side of the MEA, a platinum-based catalyst facilitates the disassociation of the hydrogen gas into electrons and protons (hydrogen ions). The hydrogen ions pass through the thickness of the membrane and combine with oxygen and electrons on the cathode side, producing water and heat. The electrons, which cannot pass through the membrane, flow from the anode to the cathode through an external circuit containing an electric load, which consumes the power generated by the cell. FIG. 1 shows a detailed schematic of a PEM fuel cell.

Fuel cells have been around since 1839, but they have been hindered by component materials which are high in cost and suffer from poor durability. Nevertheless, they have attracted much interest in recent years for their ability to produce electricity and heat with higher efficiency and lower emissions than conventional energy technologies. However, the cost of fuel cells is still too high and technical breakthroughs are required before broad commercial application can become a reality.

Despite recent advances in the design of fuel cell components, further improvements are required to transform fuel cells from the fundamental sciences into enabling technologies.

SUMMARY OF THE INVENTION

This invention relates in general to components of electrochemical devices, and to methods of preparing the components. The components and methods include the use of a composition comprising an ionically conductive polymer and at least one solvent, where the polymer and the solvent are selected based on the thermodynamics of the combination.

In one embodiment, the invention relates to a component for an electrochemical device which is prepared from a composition comprising a true solution of an ionically conductive polymer and at least one solvent, the polymer and the at least one solvent being selected such that $|\delta\ \text{solvent} - \delta\ \text{solute}| < 1$, where $\delta$ solvent is the Hildebrand solubility parameter of the at least one solvent and where $\delta$ solute is the Hildebrand solubility parameter of the polymer.

In another embodiment, the invention relates to a method of improving at least one property of a component for an electrochemical device or at least one property of the electrochemical device, the method comprising preparing the component from a composition comprising a true solution of an ionically conductive polymer and at least one solvent, the polymer and the at least one solvent being selected such that $|\delta\ \text{solvent} - \delta\ \text{solute}| < 1$, where $\delta$ solvent is the Hildebrand solubility parameter of the at least one solvent and where $\delta$ solute is the Hildebrand solubility parameter of the polymer.

Various other embodiment of the invention are described in the following specification, claims and/or drawings.

Some advantages of this invention will become apparent to those skilled in the art from the following detailed description of the preferred embodiments.

BRIEF DESCRIPTION OF THE DRAWINGS

FIG. 1 is a cross-sectional schematic diagram of a conventional PEM fuel cell.

FIG. 2 is a schematic view of an electrospinning setup.

FIGS. 3 and 4 are scanning electron micrograph images of ionomer fibers produced by an electrospinning process. FIG. 4 is an enlarged view of a portion of the image in FIG. 3.

FIG. 5 is a typical polarization curve for a PEM fuel cell.

FIG. 6 is a representative polarization curve of an electrode according to the invention compared to a state of the art electrode.

FIG. 7 is a close-up of an activation polarization region comparing an electrode according to the invention with a state of the art electrode.

FIG. 8 is a three-phase interphase schematic for a single catalytic site at the cathode of a PEM fuel cell.

FIG. 9 is a field-emission SEM image of a Pt/C electrode.

FIG. 10 is a graph comparing the durability of an electrode according to the invention with a state of the art electrode.

FIG. 11 shows AFM tapping mode images of electrodes fabricated from n-butyl acetate according to the current state of the art.

FIG. 12 shows AFM tapping mode images of electrodes fabricated from t-butyl alcohol according to the present invention.

FIG. 13 is a representative polarization curve comparing one MEA with a high aspect ratio ionomer fiber (according to the invention) and one without.

DETAILED DESCRIPTION OF THE PREFERRED EMBODIMENT

The present invention uses a novel solution thermodynamics approach to selecting an ionically conductive polymer and at least one solvent for preparing a component of an electrochemical device, such as a fuel cell. The thermodynamic approach is described in more detail below. Advantageously, the component prepared according to the invention may include improvement(s) compared to components prepared by conventional methods.

For example, the present invention may enhance fuel cell performance and/or durability by engineering the three-phase interphase of the MEAs through 1) the formulation of novel ionomer binder solutions; and, optionally, 2) the development of novel, high aspect ratio ionomer fibers to be used as precursors for electrode and/or MEA fabrication. The term "high aspect ratio", as used herein, means fibers having an aspect ratio within a range of from about 100:1 to about 1000:1 (length:diameter). The invention may create an optimized, multifunctional, nanostructured architecture which reduces polarization losses (reaction rate, resistance and mass transport losses) and/or catalyst loadings. The terms "ionomer" and "ionically conductive polymer" are used interchangeably herein to refer to a polymer having any significant proportion of ionizable and/or ionic groups.

The dominant polarization losses in a hydrogen-air fuel cell are due to the poor kinetics of the oxygen reduction reaction (ORR) and the resulting transport limitations of the protons and reactants at the cathode. An understanding of the interactions at the three-phase interphase has allowed the development of high-performance electrodes and MEAs that may reduce the polarization losses, while increasing efficiencies, energy densities and durability. The experimental details regarding MEA fabrication, single-cell testing and characterization (i.e. cyclic voltammetry and atomic force microscopy) are presented hereinbelow.

The components prepared according to the invention are important to fuel cells because they may cross all applications, fuels and chemistries. They also may have applications beyond fuel cell technologies, such as ionic polymer metallic composite (IPMC) actuators/sensors. Further, when catalysts are referred to herein, it should be recognized that the invention is not limited to catalysts per se, but it may also be applicable more generally to metals/inorganics (including salts, oxides and metal alloys) which may or may not facilitate the electrochemical reaction.

Since the focus of this invention is on the enhancement of components derived from two different MEA fabrication techniques, 1) the formulation of a novel ionomer binder solution and 2) the development of novel, high aspect ratio ionomer fibers to be used as precursors for electrode and MEA fabrication, the following description is devoted to detailing the membrane electrode assembly fabrication of each.

Ionomer Binder Solution Formulation. The invention includes a novel solution thermodynamics approach to select an ionomer and at least one solvent for use in a composition to prepare a component of an electrochemical device, such as an ionomer binder solution used to prepare an electrode. The composition is a true solution, not a dispersion or a colloidal suspension. The true solution is a single phase. A dispersion would consist of at least two phases with an interface between the dispersed and continuous phases.

According to this solution thermodynamics approach, the change in free energy, $\Delta G$, upon mixing the ionomer and the solvent(s) must be negative for the solution to be thermodynamically feasible.

$\Delta G = \Delta H - T\Delta S$; $<0$ for solubility, where $\Delta H$ is the change in enthalpy and $T\Delta S$ is the product of temperature, T, and the change in entropy, $\Delta S$.

Analyzing the above equation, it can be determined that $\Delta H$ drives polymer solubility due to specific interactions since $T\Delta S$ is generally low for polymers due to the low amount of configurational possibilities.

$\Delta H$ is related to the Hildebrand solubility parameter, $\delta$, where $|\delta \text{ solvent} - \delta \text{ solute}| < 1$ for solubility. The results of the equation could also be $<0$. This parameter represents the total van der Waals force. There are three types of interactions that are most commonly used in solubility theory. They are dispersion forces (induced dipole-induced dipole or London dispersion forces), polar forces (dipole-dipole forces) and hydrogen bonding forces. The Hildebrand value for a solvent mixture can be determined by averaging the Hildebrand values of the individual solvents by volume.

In addition to the considering the Hildebrand solubility parameter, in some cases to optimize the invention it may be desirable to consider other solvent properties, such as boiling point/vapor pressure, evaporation rate, surface tension, viscosity, hydrogen bonding, dielectric constant and/or dipole moment.

Diffusion may be enhanced by varying the molecular weights and composition of the ionomer binder materials. For example, low molecular weight ionomer binders will tend to have increased solvent diffusion rates and $H_2/O_2$ permeation rates to electrocatalyst sites. Another example would be utilizing materials that have inherently high diffusivity/permeation to $H_2/O_2$, such as PTFE, PVDF, Nafion®, blends and side-chain chemistries.

Further ways to enhance electrode performance may include manipulating the ionic functionality, hydrophobicity and/or porosity of the electrode for improved water management (to reduce mass transport losses) while optimizing the triple phase boundary (three-phase interphase) where the hydrogen oxidation reaction and the oxygen reduction reaction can only occur at localized regions where electrolyte, gas and electrically connected catalyst regions contact. One way to accomplish this is through various additive technologies. These could be fluorine-based or inorganic additives (e.g. heteropoly acids, zirconium phosphate, etc.).

Two different catalyst ink formulations were prepared. Each contained a standard catalyst: Nafion® ratio of 2.5:1 (28 weight percent ionomer binder) using 5 weight percent Nafion® 1100 EW solution (ElectroChem, Inc.) and 20 weight percent Pt on Vulcan XC-72 carbon black (E-tek DeNora). To one formulation, t-butyl alcohol (Aldrich) was added as a diluting solvent, and, to the other, n-butyl acetate (Aldrich) was added. Formulations were allowed to stir on a stir plate overnight at room temperature. The added weight of these chemicals was equal to the weight of the Nafion® binder solution in each formulation. In some instances, sonication was used to aid in the dispersion of the electrocatalyst particles. It should be noted that varying ionomer binder loadings (i.e. catalyst: ionomer binder) could be used.

Five (5) $cm^2$ transfer decals were prepared from glass-reinforced polytetrafluoroethylene (PTFE) films (Saint-Gobain). Each catalyst ink coat/layer was painted on one side of each decal with a flat brush (Winsor Newton) with the appropriate catalyst ink under infrared heat to a final dry weight containing ~0.2 mg catalyst per $cm^2$ electrode.

Nafion® 112 (Aldrich) was converted to the salt form, then MEAs were fabricated using the following procedure on a Carver hydraulic press: (1) Place MEA assembly into preheated (210 C) press and compress at 400 psig for 10 minutes. Note: This temperature and pressure may be higher depending on the type of membrane and binder material. (2) Cool under pressure to room temperature. (3) Remove from press. (4) Peel decals away from the MEA assembly one at a time leaving only the electrodes fused to the membrane.

The ionically conductive polymers for use in the invention may be any that are currently known or developed in the future. Some general categories of ionically conductive polymers may include the following. Canonical: Nafion®—poly (TFE-co-perfluorosulfonic acid). A sulfonated version of almost any poly(aromatic), such as Radel®, Kraton®, PBI, etc. Other acid groups applied to the above: sulfonimides, phosphonic acids, etc. Supported versions of the above: Gore- TEX® etc. used as supports. Polymers with imbibed solid or liquid acids, such as PBI/phosphoric acid (CWRU®) or phosphotungstic acid.

For example, some specific examples of polymers that may be used in the invention are taught in PCT App. No. PCT/US01/29293, filed Sep. 21, 2001, entitled "Ion-Conducting Sulfonated Polymeric Materials", and the preferred materials are, in particular, BPSH-xx (Bi Phenyl Sulfone) and 6F-XX-BPSH-XX (Hexafluoro Bi Phenyl Sulfone) which were used as described herein. As well, other polymers that may be used in the present invention are taught in PCT App. No. PCT/US03/09918, filed Apr. 1, 2003, entitled "Sulfonated Polymer Composition for Forming Fuel Cell Electrodes" PCT App. No. PCT/US03/03864, filed Feb. 6, 2003, entitled "Polymer Electrolyte Membranes Fuel Cell System"; and PCT App. No. PCT/US03/03862, filed Feb. 6, 2003, entitled "Polymer Electrolyte Membranes for Use in Fuel Cells". Other polymers that may be used are disclosed in U.S. Pat. No. 6,670,065 B2, issued Dec. 30, 2003, U.S. Pat. No. 6,893,764 B2, issued May 17, 2005, and U.S. Patent Application Publication No. 2005/0031930 A1, published Feb. 10, 2005. Further polymers that may be used are disclosed in U.S. Provisional Application No. 60/736815, filed Nov. 15, 2005, entitled PEM's for Fuel Cell Applications. The above-mentioned applications and patents are incorporated herein by reference, as if fully set forth herein. The present invention may be advantageously used with the materials described therein, which include the materials referred to as Battellion™.

The solvent(s) for use in the invention may be any that are currently known or developed in the future that are suitable for preparing component(s) of electrochemical devices such as fuel cells. Some examples of typical solvents and diluting agents (co-solvents) used for both Nafion® and non-Nafion® (i.e. hydrocarbon) ionomers are shown in Table 1.

High Aspect Ratio Ionomer Fiber Development. First, a BPS45 ionomer true solution (Na$^+$ form) was formulated in N,N-dimethyl acetamide (DMAC) to ~35 weight percent concentration. This solution was characterized as follows: surface tension, $\gamma$=40 dynes/cm; conductivity, $\sigma$=1574 $\mu$S/cm; viscosity, $\eta$=0.019 Pa·s @ $10^3$-$10^4$ s$^{-1}$.

The polymer(s) and solvents(s) used in this embodiment of the invention may be the same as those described above, or they may be different.

This solution was then loaded into a 10 ml glass syringe (Popper & Sons, Inc.) with either an 18 or 20 gauge syringe needle. The tip of this needle can vary (e.g. ball, blunt/straight, etc.). This syringe and needle were placed into an electrospinning setup as shown in FIG. 2.

The parameters for spinning the ionomer fiber were as follows: $\theta$~20-40°, d=4-12 cm, and potential of 10-25 kV. Electrostatic processing commenced once the gravitational forces caused the ionomer solution to exit the tip of the needle. Upon droplet formation, the high-voltage, direct current power supply was activated to form a Taylor cone, and the resulting ionomer fiber was electrospun into a non-woven mat, which was collected on the grounded target. SEM images of the ionomer fibers are shown in FIGS. 3 and 4.

This setup could be modified by laying the syringe in a horizontal position and using a syringe pump to deliver the ionomer solution to the syringe needle tip. The target would also be relocated so that it would be perpendicular to the syringe needle. This setup could be further modified with vacuum-assist if higher boiling point solvents, such as N-methyl-2-pyrrolidone (NMP), are used.

The fibers produced according to the above-described method are usually continuous fibers. It is also believed that non-continuous fibers may be electrospun and produced in accordance with the present invention to produce a mat, using techniques such as are taught in U.S. Pat. No. 6,252,129, issued Jun. 26, 2001, to Coffee (incorporated by reference herein).

The catalyst ink formulation was prepared as discussed previously using t-butyl alcohol as a co-solvent.

Single MEAs could be fabricated primarily by two different techniques utilizing this technology. One would be spinning the fiber directly onto the electrode described earlier, which also serves as the grounded target, and then applying a PEM. Another technique would be spinning the fiber directly onto a PEM by utilizing a copper frame with an aluminum backing. The PEM would be placed on top of the aluminum backing and held in place with a copper frame that comes into contact with the perimeter of the PEM. PTFE masking could also be utilized in this type of fixture where electrical insulation is needed. Once the fiber is seeded onto the membrane, a catalyst ink or electrode could be applied to the membrane/fiber. The invention allows the production of a composite electrode where the fiber serves as both the reinforcement and as the matrix for the catalyst.

The catalyst ink could be electrostatically co-sprayed with the ionomer fiber. The catalyst particles would be attracted to the positively-charged fiber via electrostatic attraction to form an electrode (e.g. the anode). It should be noted that the catalyst ink could alternatively be used without an ionomer binder. It should also be noted that the catalyst could be substituted with PtRu/C, Pt-black, PtRu-black, and other precious/non-precious metal catalysts. Single- and multi-walled carbon nanotubes could also be used in these formulations to boost electrical conductivity. It should further be noted that the electrocatalyst could be encapsulated within the ionomer fiber during the electrospinning process by including the electrocatalyst in the initial ionomer solution formulation.

The catalyst ink could be sprayed (may or may not be electrostatic) in concert with fiber formation (parallel operation), after fiber formation (series operation) or a combination of both. Once the anode is formed, the spraying of the catalyst ink could be halted so that the PEM could be processed entirely by electrospinning/electrospraying. Once the PEM is processed to a suitable mat thickness (~1 to 7 mils), the spraying of the catalyst ink could be re-engaged to produce another electrode (e.g. the cathode). This process could be performed in an iterative fashion to fabricate a continuous stack of MEAs with a single, high-aspect ratio polymer electrolyte fiber (PEF). This technique could also be used for fabricating additional layers of the MEAs, such as catalyst support structures, gas diffusion media and bipolar plates.

The general parameters for electrospinning or electrospraying in accordance with the present invention are defined through a series of ranges shown in Table 2. The data points taken through these ranges demonstrated generally linear relationships for the polymers being tested. The polymers tested included the following set forth in Table 3a and 3b, and are representative of the classes of polymers which may be used in accordance with the present invention, and as identified above.

It should be noted that both of these approaches can be used for MEAs in either direct methanol fuel cells or PEM fuel cells. Furthermore, various processing schemes, and combinations thereof, could be used to fabricate the MEAs including hot pressing, painting, and spraying. These schemes, when utilized properly, could lead to graded compositional porosity through the PEM, catalyst layers and GDL.

Single-Cell Testing

All MEAs were protonated in a 0.5M $H_2SO_4$ acid mixture at room temperature (23 C) for 2 hours followed by a deionized water rinse at room temperature for 2 hours to remove residual acid prior to fuel cell testing. Various other protonation procedures and conditions could be used, such as elevated temperature and concentration. Single-sided ELAT materials (E-tek DeNora) were used as gas diffusion media.

Single-cell testing was performed using a 600 W Fuel Cell Technologies, Inc. test station. This station is equipped with an Agilent Technologies 120 A load module, digital mass flow controllers, an automated back pressure system, 5 cm² fuel cell hardware, an on-board AC impedance system and humidity bottle assemblies. The on-board electrochemical impedance spectroscopy system was utilized to measure the in situ high frequency resistance (HFR) of each MEA at a frequency of 2 kHz. The HFR is the sum of the membrane, interfacial and electrode resistances.

All MEAs were conditioned at 80 C, 100 percent relative humidity (RH) at 0.50 V for at least 2 hours before polarization curves were collected. Polarization curves were collected from 1.00 to 0.00 V at 0.05 V increments with a 30 second delay.

Characterization

Additional characterization (i.e. cyclic voltammetry and atomic force microscopy) was performed on the MEAs fabricated from the ionomer binder solution formulations. Details regarding these experimental techniques are presented here.

Cyclic Voltammetry. Linear Sweep Voltammetry at 5 mV per second with dilute hydrogen at 30 psig cell pressure was performed with a Solartron Analytical SI 1287 Electrochemical Interface. The test was run as described in the Handbook of Fuel Cells—Fundamentals Technology and Applications, vol. 3, pp. 545-562. The resulting ECA was calculated based on the following equation.

$$ECA\left(\frac{cm^2\ Pt}{g\ Pt}\right) = \frac{\text{charge for } H_2 \text{ adsorption/desorption}\left(\frac{\mu C}{cm^2\ \text{electrode}}\right)}{\left(210\frac{\mu C}{cm^2\ Pt}\right) \times \text{catalyst loading}\left(\frac{g\ Pt}{cm^2\ \text{electrode}}\right)}$$

Atomic Force Microscopy. Tapping mode atomic force microscopy (AFM) was performed with a Digital Instruments Dimension 3000 scanning probe microscope with a Nanoscope IV controller. A tapping mode tip made of etched single crystal silicon with a nominal tip radius of curvature of 5-10 nm was used during scanning. All samples were kept under desiccant for 24 h prior to analysis. The samples were then scanned immediately at room temperature within a 5 µm² sample area.

Results and Discussion

The electrochemical performance of a fuel cell is typically determined by analyzing a polarization curve (cell potential versus current density) as shown in FIG. 5. This curve shows a typical fuel cell operation where numerous irreversible losses contribute to overpotentials which cause the cell potential to drop significantly below the theoretical (ideal) value of 1.23 V at 25 C as determined by the Nernst equation. The same holds true for the polarization losses compared to the open circuit voltage during an experimental run. Voltage losses differ between theoretical and experimental equilibrium cell voltages due to the cathode mixed potential between $O_2$ reduction and $H_2$ oxidation from crossover to Pt/C. The initial decrease is associated with the activation polarization region where reaction rate losses at the electrocatalyst dominate due to the sluggish reaction kinetics and low catalyst activity. This is followed by a linear drop in cell potential due to resistance losses (i.e. ohmic polarization). Resistance losses are a combination of the resistance to the flow of electrons through the electrodes and interconnects and the resistance to the flow of ions through the electrolyte. The catastrophic drop in voltage at higher current densities is termed concentration polarization and is generally due to mass transport limitations of reactants to the catalytically-active sites.

Since the focus of this invention is on the enhancement of components derived from two different MEA fabrication techniques, 1) the formulation of a novel ionomer binder solution and 2) the development of novel, high aspect ratio ionomer fibers to be used as precursors for electrode and MEA fabrication, the following description is devoted to discussing the results of each.

Ionomer Binder Solution Formulation. Representative polarization curves comparing an electrode according to the invention (t-butyl alcohol formulation) to the current state of the art (n-butyl acetate formulation) are shown in FIGS. 6 and 7. FIG. 6 captures the polarization region down to 0.4 V, which makes it relatively easy to discern the resulting overpotential over a range of cell potentials. FIG. 7 shows a close-up of the activation polarization region. If one uses 0.70 V as a benchmark for comparison between the electrodes, it can be seen from FIG. 6 that the Battelle electrode (t-butyl alcohol formulation) has a current density of 0.6760 A per cm² with a high frequency resistance (HFR) equal to 0.06 Ω·cm² while the state-of-the-art electrode (n-butyl acetate formulation) has a current density of 0.3996 A per cm² with a HFR equal to 0.08 Ω·cm². If one uses 0.85 V as a benchmark for comparison between the electrodes, it can be seen from FIG. 7 that the Battelle electrode (t-butyl alcohol formulation) has a current density of 0.0631 A per cm² (HFR equal to 0.06 Ω·cm²) while the state-of-the-art electrode (n-butyl acetate formulation) has a current density of 0.0288 A per cm² (HFR equal to 0.08 Ω·cm²). These results may seem surprising since the same catalyst loadings and pressing conditions were used. However, the solvent system can have a significant impact on the electrode structure and MEA performance prior to the final MEA fabrication step. In order to understand this further, one must first understand the three-phase interphase.

Catalytic sites within fuel cell electrodes maintain a three-phase interphase to be effective. This interphase allows for electronic and ionic continuity while providing access to fuel or oxidant. See FIG. 8 for a detailed schematic of a single catalytic site at the cathode. FIG. 9 shows a field-emission scanning electron microscope (SEM) image of an actual Pt catalyst supported on carbon black (Pt/C) electrode, which comprises the continuity phase. The larger open areas provide access for fuel or oxidant, which is the second phase. The ionomer binder and membrane, which serve as the third phase, are absent from this photo so that the Pt/C structure would be more apparent. It is desirable to satisfy all three conditions for as many catalytic sites as possible through electrode engineering to offer improvements in MEA performance.

Nafion® forms one of three states when mixed with organic solvents: (i) solution, (ii) colloidal dispersion, and (iii) precipitate. A true solution is formed when the dispersed phase is molecularly dispersed, whereas in a colloidal dispersion the dispersed phase, or colloid, is larger than the molecule. The colloids are characteristic of dimension, however, they are also evenly dispersed throughout the dispersion medium (i.e. solvent). A typical scale for colloids is between 1 and 1,000 nm. As these colloids become larger they will either rise to the surface or fall out of solution forming a precipitate depending on the relative specific gravities. For Nafion-based polymers and certain solvents under certain conditions, these states can be classified by the dielectric constant, $\in$. The dielectric constant is used as a rough indication of the solvent's polarity. Some guidelines for Nafion®-based systems are as follows:

When $\in$ is greater than 10, a solution is formed.

When $\in$ is greater than 3, but less than 10, a colloidal dispersion is formed.

When $\in$ is less than 3, precipitation occurs.

Uchida et al, Journal of the Electrochemical Society, vol. 142, page 463 (1995) experimented with a variety of solvents and found that n-butyl acetate ($\in$=5.01) was the best performance-enhancing dispersant agent due to its ability to form a colloidal dispersion. The proposed mechanism that was suggested was that Nafion® filled the macropores increasing the Pt/ionomer contact area. At higher Nafion® loadings, however, the ionomer hindered the rate of oxygen transport and the rate of water removal.

It was also found in the Uchida et al. publication that all solvent systems with dielectric constants greater than 10 formed solutions and resulted in MEAs that performed poorly in a fuel cell environment. However, t-butyl alcohol was not utilized in this study. Tert-butyl alcohol is a water and alcohol soluble material with a boiling point of 82.9 C, which is noticeably lower than butyl acetate (126.3 C), and has a dielectric constant, where $\in$=12.47 at 25 C and 10.9 at 30 C.

Furthermore, it is shown hereinbelow in FIGS. 6 and 7, that t-butyl alcohol offers a pronounced improvement in fuel cell performance compared to the n-butyl acetate system, which is contrary to the work of Uchida et al. It should also be noted that the high-frequency resistance (HFR) dropped from 0.08 to 0.06 $\Omega \cdot cm^2$. Thus, the improved electrode structure also reduced the resistance/impedance throughout the MEA. More generally, electrodes prepared according to the invention may have improved performance as measured by a current density of at least about 0.6 A/cm² at a cell potential of 0.7 V with a high frequency resistance less than 0.08 $\Omega \cdot cm^2$, under the conditions shown in FIG. 6. The electrodes may have improved performance over time as measured by a current density of at least about 0.6 A/cm² at a cell potential of 0.7 V with a high frequency resistance less than 0.08 $\Omega \cdot cm^2$, and a current density of at least about 0.04 A/cm² at a cell potential of 0.85 V with a high frequency resistance less than 0.08 $\Omega \cdot cm^2$.

In some embodiments, membrane electrode assemblies prepared according to the invention provide a surprising durability benefit. When an electrode of the assembly is produced using a true solution according to the invention, this has the effect of improving the durability of the polymer electrolyte membrane of the assembly. FIG. 10 shows a membrane of an MEA according to the invention having superior durability compared to the state of the art in an open circuit voltage experiment. In a preferred embodiment, the invention provides a membrane electrode assembly wherein at least one of the electrodes is prepared from a composition including an ionomer and at least one solvent selected as described above, the membrane of the assembly having improved durability as measured by an open circuit voltage (OCV) holding time of at least about 100 hours under the conditions shown in FIG. 10, and preferably at least about 300 hours. More generally, the invention provides a method of improving the durability of a second component of an electrochemical device by preparing a related first component of the electrical device from a true solution according to the invention. The invention also provides a method of improving the durability of a component of an electrochemical device by preparing the component from the true solution according to the invention. More generally, the invention provides a method of improving one or more properties of an electrochemical device or its components by preparing at least one component of the electrochemical device with a true solution according to the invention. The invention can apply to any types of components, such as membrane electrode assemblies, membranes, electrodes and/or gas diffusion layers.

Beyond high performance and durability, another typically preferred property of an electrode structure is high catalyst utilization. To determine this, the in situ ECA within the fuel cell was measured by cyclic voltammetry using the area under the hydrogen adsorption/desorption peaks. These results are shown in Table 4. Surprisingly, the t-butyl alcohol system produced an electrode structure with a significantly reduced ECA range compared to the n-butyl acetate system. In other words, the electrode according to the invention has a low catalyst utilization while still having an improved performance. In one embodiment, the electrode has a low catalyst utilization as measured by an electrochemical area of less than about 40 square meters of catalyst per gram of catalyst, sometimes less than about 35 square meters of catalyst per gram of catalyst, and the electrode has improved performance as measured by a current density of at least about 0.6 A/cm² at a cell potential of 0.7 V with a high frequency resistance less than 0.08 $\Omega \cdot cm^2$.

Since the efficiency of catalyst utilization at high current density is dictated by mass transfer, which is governed by pore and ionomer distribution as well as the oxygen concentration gradient through the thickness of the electrode, it is conceivable that these novel electrodes enhanced the competing requirements for proton, reactant gas and water transport. Although it was apparent from these results that the rate of oxygen transport may have been hindered, water removal must have been enhanced to allow such performance improvements. This enhancement may have led to the increased polarization at high current density, where the catalyst layer resistances usually dominate. By improving the distribution of hydrophilic materials in the vicinity of the catalyst, it may help to draw water away from the active sites thereby improving water transport and reducing localized flooding (i.e. optimizing water management and reducing mass transport losses).

AFM was utilized to examine the surface morphology of the electrodes. Tapping mode amplitude and phase images of the electrodes were recorded under ambient conditions on a 5 μm×5 μm scale in order to investigate the relative differences in surface morphology of the materials as shown in FIGS. 11 and 12. In FIG. 11, it can be seen that there are relatively large polymeric islands or domains present which disrupt the surface morphology and thus the continuity of the three-phase interphase in the n-butyl acetate system. These islands range from about 0.63 μm to as large as 2.50 μm in length. From FIG. 12, however, it can be clearly seen that the t-butyl alcohol system offers an electrode morphology that appears to be closer to a percolation threshold compared to the n-butyl acetate system, where there is more of an optimum balance and distribution between the components that provide ionic transport, oxygen diffusion, water transport and an electrochemically active surface area. This also allows greater adhesion to the membrane substrate due to the possible increase in polymer surface area that comes in contact with the membrane. These islands or domains are typically smaller than 0.63 μm in any one direction. In one embodiment of the invention, the electrode has a morphology that includes domains of the polymer, where at least about 80% of the polymer domains are smaller than about 0.63 μm in any one direction, and preferably substantial all of the polymer domains are smaller than this size. The polymer domains may be present on the surface of the electrode and/or they may be present throughout the electrode.

The solubility of the blends can change during electrode drying because of the difference in evaporation rates of the individual components. Azeotropic mixtures, a mixture of two or more liquids that has a constant boiling point, can aid in this process.

Some advantages of the present invention may include: increased energy densities and efficiencies; reduced polarization losses; and reduced catalyst loadings. In addition, advantages during MEA fabrication may include: enhanced solvent removal (due to vapor pressures of the solvents); paintability; faster processing due to enhanced evaporation rate; more precise control of catalyst loadings (layer-to-layer consistency); enhanced electrode adhesion, and no need for viscosity modifiers (e.g. glycerol).

High Aspect Ratio Ionomer Fiber Development. Two different electrodes were fabricated for this study. One included the high aspect ratio ionomer fiber while the other did not. A representative polarization curve comparing these is shown in FIG. 13. FIG. 13 captures the polarization region down to 0.4 V, which makes it relatively easy to discern the resulting overpotential over a range of cell potentials. If one uses 0.65 V as a benchmark for comparison between the electrodes, it can be seen from FIG. 13 that the Battelle invention (with ionomer fiber) has a current density of 0.545 A per cm$^2$ with a HFR equal to 0.09 Ω·cm$^2$ while the one without an ionomer fiber has a current density of 0.395 A per cm$^2$ with a HFR equal to 0.06 Ω·cm$^2$.

It is believed that a highly engineered electrode structure was produced which enabled the simultaneous and efficient access of protons, electrons and fuel to catalyst sites by incorporating a continuous, non-woven, high aspect ratio ionomer fiber mat within the electrode. This mat enhanced MEA performance by creating a multifunctional, nanostructured architecture, which reduced polarization losses. This ionomer fiber provided a proton conducting pathway to the catalyst sites, which created an intimate interphase with the electrocatalyst while maintaining contact with the membrane of like materials. Finally, the polymer membrane and catalyst layers likely had commensurate dimensional changes upon hydration, thermal cycling, etc., which led to reductions in the overall internal resistance within the MEA causing an increase in performance. This process also has advantages gained by forming fiber mats on the surface of conventional membranes to increase their effective electrode area while matching coefficients of thermal expansion and water uptake rates between the electrode and the membrane, which minimizes stresses throughout the MEA.

The present invention may allow the production of PEM-based electrodes that function at >100° C. and <50% RH.

The invention may also allow the production of a direct methanol fuel cell (DMFC) electrode and electrode assembly with decreased MeOH crossover, higher operating MeOH concentration, decreased flooding and increased durability.

As described above, in one embodiment of the invention, the electrode and the polymer electrolyte membrane are both made with the same type of ionomer fiber. This embodiment provides several advantages, such as no mismatch of coefficients of thermal expansion, and thus minimized residual stresses throughout the MEA. An improved MEA is provided where the electrodes and PEM can shrink/swell in concert with each other. Electrodes are produced that now match higher temperature, lower humidity performing polymer membranes made with materials as described above Some other advantages of the invention may include a highly-tailorable electrode in regards to solid-state and surface chemistry to optimize the interphase. The electrode may be mechanically tough with the ability to impart flexibility and blunt cracks. The electrode may have improved water management to behave similarly to the Nafion®-alternative PEM. An MEA prepared according to the invention may have improved mechanical and electrostatic bonding.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

TABLE 1

Solvent and Diluting Agent Properties

| Solvent | Hydrogen Bonding | Solubility Parameter (MPa$^{0.5}$) | Dielectric Constant |
|---|---|---|---|
| ethyl acetate | m | 18.6 | 6.02 |
| methyl ethyl ketone | m | 19 | 18.4 |
| ethylene glycol monobutyl ether | m | 19.4 | — |
| dichloromethane | m | 19.8 | 8.9 |
| acetone | m | 20.3 | 20.7 |
| dioxane | m | 20.5 | 2.2 |
| N-methyl-2-pyrrolidone | m | 23.1 | 33 |
| N,N-dimethyl formamide | m | 24.8 | 37 |
| dimethyl sulfoxide | m | 29.7 | 46.7 |
| chloroform | p | 19 | 4.8 |
| acetonitrile | p | 24.3 | 37.5 |
| t-butyl alcohol | s | 21.7 | 12.4 |
| 1-butanol | s | 23.3 | 17.5 |
| isopropyl alcohol | s | 23.5 | 19.9 |
| benzyl alcohol | s | 24.8 | 13.1 |
| ethanol | s | 26 | 24.55 |
| methanol | s | 29.7 | 32.6 |
| glycerol | s | 33.8 | 42.5 |
| water | s | 47.9 | 78.4 |
| n-butyl acetate | m | 17.4 | 5.01 |
| N,N-dimethyl acetamide | m | 22.1 | 37.8 |
| 2-methoxyethanol | m | 23.3 | 16.93 |
| hexane | p | 14.9 | 2.0 |

TABLE 2

Electrospinning/Electrospraying Condition Ranges

| | Maximum | Minimum | Numerous data points exist through the range |
|---|---|---|---|
| Distance to Target | 4 cm | 12 cm | Yes |
| Orifice Diameter | 22 gauge | 18 gauge | Yes |
| Electrical Potential | 5 kV | 30 kV | Yes |
| Flow Rate | 0 mL/hr | 0.26 mL/hr | Yes |
| Orifice Geometry | blunt tip | ball tip | |
| Polarity | positive | negative | |

TABLE 3a

Trial Data

| Trial | Polymer | Concentration Range (wt %) | Viscosity (Pa·s) |
|---|---|---|---|
| 1 | BPSH45 | 15-45 | 0.01-0.03 |
| 2 | BPSH35-6F30 | 25-25 | |
| 3 | Nafion ® | 5-25 | |

TABLE 3b

Trial Data

| Trial | Viscosity Shear Rate ($s^{-1}$) | Surface Tension (dynes/cm) | Conductivity (µS/cm) |
|---|---|---|---|
| 1 | $10^3$-$10^4$ | 35-45 | 700-1600 |
| 2 | | | |
| 3 | | | |

TABLE 4

Electrochemical Area Ranges

| Sample | ECA range ($m^2$ Pt/g Pt) |
|---|---|
| 28 wt. % t-butyl alcohol | 27.7-31.2 |
| 28 wt. % n-butyl acetate | 43.3-47.4 |

What is claimed is:

1. A component for a fuel cell which is prepared from a composition comprising a true solution, wherein said true solution is made of an ionically conductive polymer and at least one solvent, the polymer and the at least one solvent being selected so that |δ solvent−δ solute|<1, where δ solvent is the Hildebrand solubility parameter of the at least one solvent and δ solute is the Hildebrand solubility parameter of the polymer in units of $MPa^{0.5}$.

2. The component defined in claim 1 which is an electrode for a fuel cell, wherein the composition further comprises a catalyst.

3. The component defined in claim 1 which is a membrane for a fuel cell.

4. The component defined in claim 1 which is a membrane electrode assembly for a fuel cell comprising a polymer electrolyte membrane having electrodes on both sides, at least one of the membrane and the electrodes prepared from the composition.

5. The component defined in claim 1 wherein the ionically conductive polymer comprises a perfluorosulfonic acid polymer.

6. The component defined in claim 1 which is an electrode for a fuel cell, wherein the composition further comprises a salt, an oxide or a metal alloy.

7. The component defined in claim 1 wherein the true solution is a polymer binder solution, the polymer in the solution functioning as a binder when combined with a catalyst.

8. The component defined in claim 1 which is a catalyst ink that additionally comprises a catalyst along with the ionically conductive polymer and the at least one solvent.

9. The component defined in claim 1 which is an electrode for the fuel cell, the electrode having a morphology that includes domains of the polymer, at least about 80% of the polymer domains being smaller than about 0.63 µm in any one direction.

10. The electrode defined in claim 9 wherein all of the polymer domains are smaller than about 0.63 µm in any one direction.

11. The electrode defined in claim 9 wherein the morphology includes the polymer domains throughout the electrode.

12. A membrane electrode assembly for a fuel cell comprising a polymer electrolyte membrane and a pair of electrodes on opposing sides of the membrane, wherein at least one of the electrodes is the component defined in claim 1, the membrane electrode assembly having improved durability as measured by an open circuit voltage (OCV) holding time of at least about 100 hours.

* * * * *